(12) United States Patent
Shiina et al.

(10) Patent No.: US 11,060,264 B2
(45) Date of Patent: Jul. 13, 2021

(54) OPERATION GUIDE DEVICE

(71) Applicant: HITACHI CONSTRUCTION MACHINERY CO., LTD., Tokyo (JP)

(72) Inventors: Takeshi Shiina, Kasumigaura (JP); Hiroshi Kanezawa, Kashiwa (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 324 days.

(21) Appl. No.: 16/328,931

(22) PCT Filed: Feb. 27, 2018

(86) PCT No.: PCT/JP2018/007137
§ 371 (c)(1),
(2) Date: Feb. 27, 2019

(87) PCT Pub. No.: WO2018/180115
PCT Pub. Date: Oct. 4, 2018

(65) Prior Publication Data
US 2019/0249399 A1    Aug. 15, 2019

(30) Foreign Application Priority Data

Mar. 29, 2017  (JP) .............................. JP2017-064729

(51) Int. Cl.
  *B60K 31/02*  (2006.01)
  *B60K 31/04*  (2006.01)
  (Continued)

(52) U.S. Cl.
  CPC ............... *E02F 9/267* (2013.01); *E02F 9/20* (2013.01); *E02F 9/2004* (2013.01);
  (Continued)

(58) Field of Classification Search
  None
  See application file for complete search history.

(56) References Cited

U.S. PATENT DOCUMENTS 5,631,825 A * 5/1997 van Weele ....... G05B 19/41875
                                                    700/83
2003/0126980 A1    7/2003 Barden
(Continued)

FOREIGN PATENT DOCUMENTS

JP       6-248665 A    9/1994
JP    2003-176553 A    6/2003
(Continued)

OTHER PUBLICATIONS

International Search Report (with English translation of Search Report) and Written Opinion for PCT/JP2018/007137, dated Apr. 10, 2018.

*Primary Examiner* — Redhwan K Mawari
*Assistant Examiner* — Melanie J Patrick
(74) *Attorney, Agent, or Firm* — Mattingly & Malur, PC

(57) ABSTRACT

A guide controller that displays an operation guide image for a hydraulic excavator acquires operation signals outputted from operating devices formed of electric operating levers and stores them in a collected data storage section, compares strokes of the operating devices as derived from the operation signals, which are stored in the collected data storage section, with standard strokes corresponding to standard operation procedures out of standard operation pattern data stored in a standard operation pattern storage section, and, if a deviation equal to or greater than a predetermined standard stroke threshold is determined to exist between at least one of the strokes and the corresponding standard stroke, to read the operation guide image from the standard operation pattern storage section and to display it on a display.

7 Claims, 7 Drawing Sheets

(51) Int. Cl.
    *E02F 9/26*          (2006.01)
    *E02F 9/20*          (2006.01)
    *G05B 19/042*     (2006.01)
    *E02F 9/22*          (2006.01)
    *G05B 23/02*      (2006.01)
    *F16H 61/02*      (2006.01)
    *E02F 3/32*          (2006.01)

(52) U.S. Cl.
    CPC .............. *E02F 9/2267* (2013.01); *E02F 9/26* (2013.01); *G05B 19/042* (2013.01); *G05B 23/02* (2013.01); *E02F 3/32* (2013.01); *G05B 2219/2641* (2013.01)

(56) References Cited

U.S. PATENT DOCUMENTS

2013/0289760 A1 * 10/2013 Angerer .................. B21D 5/00
                                                                                                                                       700/165
2018/0202130 A1      7/2018   Morimoto

FOREIGN PATENT DOCUMENTS

| | | |
|---|---|---|
| JP | 2008-077319 A | 4/2008 |
| JP | 2014-074319 A | 4/2014 |
| JP | 2016-084663 A | 5/2016 |
| JP | 2016-216909 A | 12/2016 |
| WO | 2017/047654 A1 | 3/2017 |

* cited by examiner

OPERATION GUIDE DEVICE

TECHNICAL FIELD

This invention relates to an operation guide technique for a hydraulic excavator.

BACKGROUND ART

With a view to ensuring satisfaction of operational conditions based on the use environment of a machine, Patent Document 1 discloses the following program configurations: "the kinds of machines to be used, environments in which the machines are to be used, and operation restraint conditions defining operable ranges for the machines in correspondence to the respective environments, respectively, have been stored beforehand in an IC card. If an operator inserts the IC card into an IC card reader and writer and inputs the kind of his or her machine and its use environment via an operation panel, a controller reads operation restraint conditions, which conform to the inputted details, from the IC card via the IC card reader and writer, and controls an engine and cylinders so that the operation restraint conditions can be satisfied. (extracted from the Abstract)".

PRIOR ART DOCUMENT

Patent Document

Patent Document 1: JP H06-248665 A

DISCLOSURE OF THE INVENTION

Problem to Be Solved by the Invention

For diagnosis of operational conditions of a hydraulic excavator, the hydraulic excavator may be caused to undergo a particular movement, and may then be observed for its behavior during the movement. According to Patent Document 1 cited above, the engine and cylinders may be controlled based on the operation restraint conditions. However, the operation skill level of each operator is not taken into account, so that as a potential problem, the movement for the measurement of operational conditions may not be appropriately performed if the operator is changed.

With the foregoing circumstances in view, the present invention has as an object thereof the provision of a technique that reduces a consequence of differences in operators' operation skill level on the measurement of operational conditions of a hydraulic excavator.

Means for Solving the Problem

The present invention provides an operation guide device for a hydraulic excavator including an undercarriage, an upperstructure disposed so as to revolve on the undercarriage and an articulated front working device raisably and lowerably disposed on the upperstructure. The hydraulic excavator includes a plurality of potentiometers that is provided on respective operating devices comprised of electric levers and configured to operate respective operating members, which construct the front working device, and the upperstructure so that operation signals are generated corresponding to input operations by an operator, a plurality of proportional solenoid valves that drives a plurality of actuators which actuate the respective operating members and upperstructure in correspondence to the operation signals from the potentiometers, and a main controller programmed to control the proportional solenoid valves responsive to the operation signals. The operation guide device comprises a guide controller connected to each of the main controller and a display. The guide controller comprises a standard operation pattern storage section and a collected data storage section, which are comprised of a storage device. The guide controller is programmed to store, beforehand, standard operation procedures for a time of measurement of operational conditions, standard operation pattern data representing standard strokes in individual procedures included in the standard operation procedures, and an operation guide image representing details of standard operations along the standard operation procedures, to acquire operation signals representing details of operations of at least one of the operating devices by the operator and to store the operation signals along a time series in the collected data storage section, to compare a stroke of the at least one operating device as derived from each operation signal stored in the collected data storage section with the corresponding standard stroke indicated in the standard operation pattern data, and, if a deviation equal to or greater than a predetermined standard stroke threshold is determined to exist between the operating stroke and the standard stroke, to read the operation guide image from the standard operation pattern storage section and to display the operation guide image on the display.

Advantageous Effects of the Invention

According to the present invention, a technique is provided to reduce effects of a variation in operators' operation skill level on the measurement of operational conditions of a hydraulic excavator. Objects, configurations and advantageous effects other than those described above will become apparent from the following description of an embodiment.

MODES FOR CARRYING OUT THE INVENTION

The embodiment of the present invention will hereinafter be described in detail based on the drawings. Throughout all the figures for describing the embodiment, members having the same functions are designated by assigning the same or related numerals or signs, and their repeated descriptions are omitted. In the following embodiment, descriptions of the same or similar elements will not be repeated in principle unless specifically needed.

Figure 1:
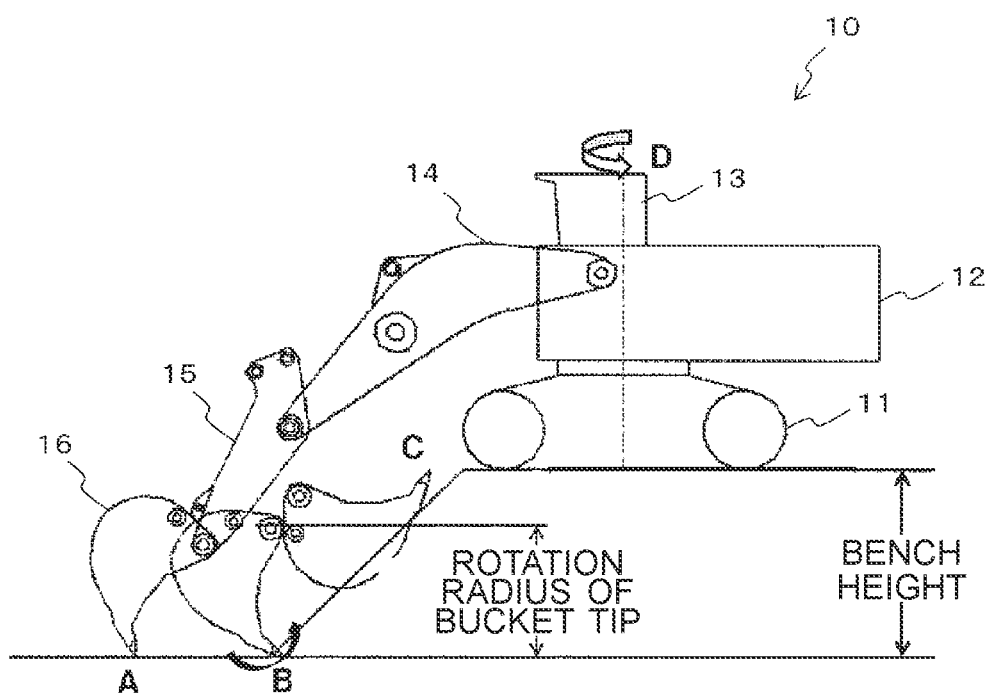
FIG. 1 is an external view of a hydraulic excavator.
Figure 2:
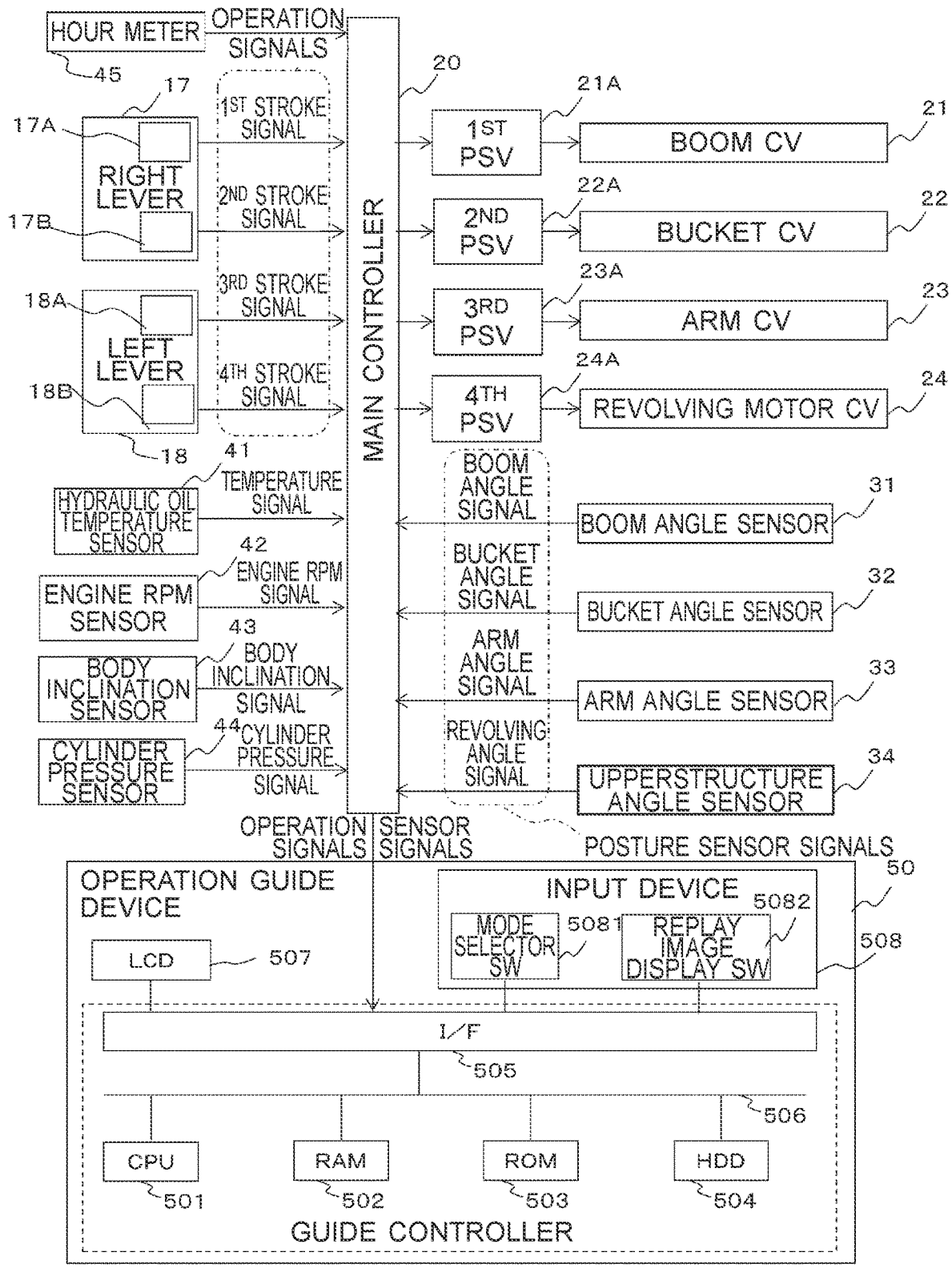
FIG. 2 is a block diagram illustrating internal configurations of the hydraulic excavator.

FIG. 1 is an external view of a hydraulic excavator. FIG. 2 is a block diagram illustrating internal configurations of the hydraulic excavator.

As illustrated in FIG. 1, the hydraulic excavator 10 includes an undercarriage 11 having a pair of left and right crawlers, an upperstructure 12 supported so as to revolve and mounted on the undercarriage 11, a cab 13 mounted on the upperstructure 12, and an articulated front working device attached to the upperstructure 12. The front working device includes a boom 14 supported raisably and lowerably relative to the upperstructure 12, an arm 15 supported pivotally up and down on the boom 14, and a bucket 16 pivotally supported on the arm 15. Further, unillustrated hydraulic motor and hydraulic cylinders are also included as actuators for performing traveling with the undercarriage 11, revolving of the upperstructure 12, and raising and lowering or pivoting of the boom 14, arm 15 and bucket 16, respectively. The hydraulic motor is provided for revolving or the like, while the hydraulic cylinders are provided for causing the boom 14 and the like to rise and lower or to pivot. It is to be noted that a hydraulic actuation system is assumed herein but an electric actuation system such as, for example, electric motors or linear actuators may also be used without being limited to such a hydraulic actuation system. The front working device and upperstructure correspond to operating members, and their pivot angles and revolving angle correspond to movement quantities.

In the cab 13 electric levers consisting of a right lever 17 and a left lever 18 illustrated in FIG. 2 are configured. These electric levers correspond to the operating devices. Forward or backward operation of the right lever 17 lowers or raises the boom 14, leftward or rightward operation of the right lever 17 lowers or raises the bucket 16, forward or backward operation of the left lever 18 causes the arm 15 to extend or retract, and leftward or rightward operation of the left lever 18 causes the upperstructure 12 to revolve counterclockwise or clockwise.

A hydraulic excavator for operation in a mine is a so-called ultra-large excavator having a tare weight as much as 100 tons or greater, and generally uses operating levers of an electric lever type that proportional solenoid valves are actuated by operation signals from potentiometers, which convert strokes of the operating levers to corresponding electrical signals and output them, and control valves are actuated by pilot pressure signals outputted from the proportional solenoid valves. Accordingly, the operation signals outputted from the potentiometers correspond to the pilot pressure signals outputted from the proportional solenoid valves. In general, an electric lever has potentiometers built in beforehand corresponding to its operating directions, and is configured to output signals from the potentiometers.

If the right lever 17 and left lever 18 as electric operating levers are operated, pilot pressure signals that represent the strokes of the respective levers are outputted to a main controller 20. These pilot pressure signals will hereinafter be called "the first operation signal" outputted from a first potentiometer 17A and representing a pilot pressure corresponding to a forward or backward stroke of the right lever, "the second operation signal" outputted from a second potentiometer 17B and representing a pilot pressure corresponding to a leftward or rightward stroke of the right lever, "the third operation signal" outputted from a third potentiometer 18A and representing a pilot pressure corresponding to a forward or backward stroke of the left lever, and "the fourth operation signal" outputted from a fourth potentiometer 18B and representing a pilot pressure corresponding to a leftward or rightward stroke of the left lever.

The first operation signal to the fourth operation signal are inputted to a first proportional solenoid valve (PSV) 21A, second proportional solenoid valve (PSV) 22A, third proportional solenoid valve (PSV) 23A and fourth proportional solenoid valve (PSV) 24A, respectively, via the main controller 20. The first proportional solenoid valve 21A, second proportional solenoid valve 22A, third proportional solenoid valve 23A and fourth proportional solenoid valve 24A then open or close a boom control valve (CV) 21, bucket control valve (CV) 22, arm control valve (CV) 23, and revolving motor control valve (CV) 24 according to the first operation signal to the fourth operation signal, respectively, so that pilot pressures are generated corresponding to the operation signals. As a consequence, the details of operations by an operator are transmitted, via the respective control valves, to individual hydraulic actuators that include an unillustrated revolving motor, boom cylinder, arm cylinder and bucket cylinder.

If the right lever 17 and left lever 18 are operated, operation signals (which may also be called "pilot pressure signals") corresponding to the strokes of the respective levers are outputted to the main controller 20. These operation signals represent details of the operations of the right lever 17 and left lever 18.

The hydraulic excavator 10 includes a boom angle sensor 31, bucket angle sensor 32, arm angle sensor 33, and upperstructure angle sensor 34. A boom angle signal, bucket angle signal, arm angle signal and revolving angle signal detected by the respective sensors are outputted to the main controller 20. The boom angle sensor 31, bucket angle sensor 32, arm angle sensor 33, and upperstructure angle sensor 34 correspond to posture sensors that measure postures of operating members moving according to operations by the operator, and the boom angle signal, bucket angle signal, arm angle signal and revolving angle signal correspond to posture sensor signals outputted from the individual posture sensors, respectively.

The boom angle, bucket angle, arm angle and revolving angle represent actual operation quantities or postures of the boom, bucket, arm and upperstructure. On the other hand, the first operation signal to fourth operation signal represent strokes which the operator has inputted to operate the hydraulic excavator 10. If the boom, bucket, arm and upperstructure are free of restrictions on movements, the strokes and actual operation quantities correspond each other. However, if the operator continues to tilt the right lever 17 leftward, for example, although the bucket has already been in contact with a hard ground and cannot be lowered or crowded further, the bucket angle does not change corresponding to the stroke so that the response of the bucket angle to the stroke is lowered.

In addition, the hydraulic excavator 10 also includes a hydraulic oil temperature sensor 41 and an engine rpm sensor 42, and a temperature signal and engine rpm signal are outputted to the main controller 20. Signals and posture sensor signals outputted from the individual sensors are collectively called "the operation signals", and the first operation signal to the fourth operation signal are called "the operation signals". Further, sensors that output sensor signals to be collected in an operational condition measurement mode, which will be described subsequently herein, are collectively called "the sensors".

An operation guide device 50 is connected to the main controller 20. The operation guide device 50 performs an operation guide upon measurement of operational conditions for the collection of operational condition measurement data from the hydraulic excavator 10.

The operation guide device 50 is configured of a guide controller (computer) in which a central processing unit (CPU) 501, random access memory (RAM) 502, read only memory (ROM) 503, hard disk drive (HDD; storage device) 504 and I/F 505 are connected together via a bus 506. To the I/F 505, an LCD (display) 507, an input device 508 and the main controller 20 are connected. The input device 508 includes a mode selector switch (SW) 5081 and replay image display switch (SW) 5082. The LCD 507 is arranged in the cab 13, and an operation guide image is displayed on its screen. The operation guide image provides the operator with operation guide information. It is to be noted that the operation guide information is not limited to such an image but may be speech information of operation details such as, for example, "Please tilt the right lever down forward".

Figure 3:
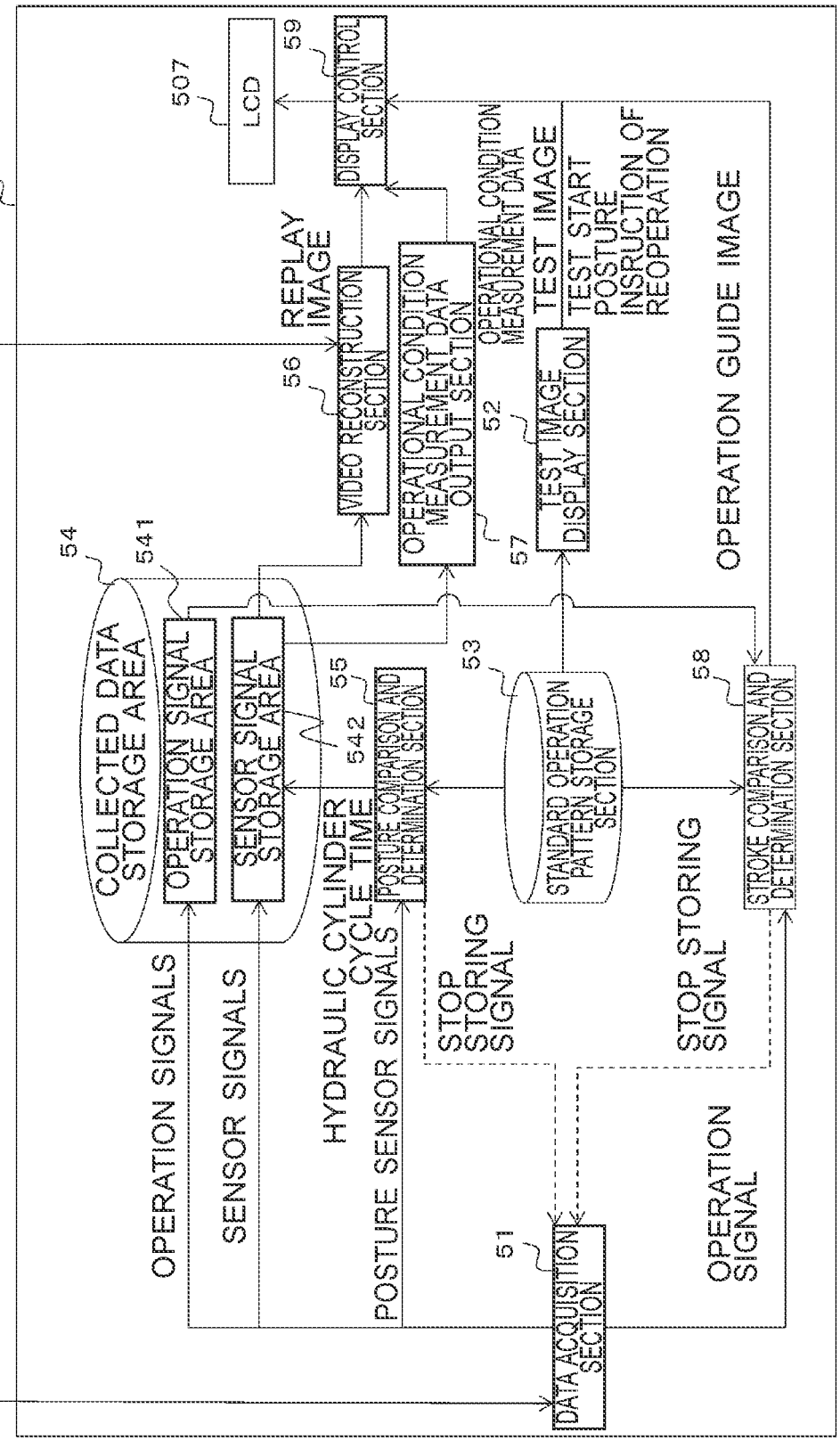
FIG. 3 is a block diagram illustrating functional configurations of an operation guide device.

With reference to FIG. 3, a description will be made about functional configurations of the operation guide device 50. FIG. 3 is a block diagram illustrating the functional configurations of the operation guide device 50. The operation guide device 50 includes a data acquisition section 51, test image display section 52, standard operation pattern storage section 53, collected data storage section 54, posture comparison and determination section 55, video reconstruction section 56, operational condition measurement data output section 57, stroke comparison and determination section 58, and display control section 59. The collected data storage section 54 includes an operation signal storage area 541 and sensor signal storage area 542.

The data acquisition section 51 includes an operation signal acquisition section, which acquires operation signals, and an operation-related data acquisition section, which acquires sensor signals. The standard operation pattern storage section 53 stores standard operation pattern data, an operation guide image and a reoperation guide image. The standard operation pattern data represent standard operation procedures at the time of measurement of operational conditions of the hydraulic excavator 10 and standard strokes and standard movement quantities in the individual procedures. The operation guide image represents details of standard operations. The reoperation guide image urges reoperations so that the operating members (the boom 14, arm 15, bucket 16 and upperstructure 12) take postures indicated by the operational condition measurement starting posture data. Further, the test image display section 52 reads test start posture data from the standard operation pattern storage section 53, and outputs a display instruction of a test image to the display control section 59.

Here, the term "test" means a measurement of operational conditions, which is performed to collect operational condition measurement data of the hydraulic excavator 10. On the other hand, the term "test start posture data" means operational condition measurement starting posture data that define the postures of the operating members at a stating time of measurement of operational conditions of the hydraulic excavator 10 and are included in the standard operation pattern data.

The collected data storage section 54 stores acquired operation signals and sensor signals in association with each other in a time series. The posture comparison and determination section 55 compares each sensor signal with its corresponding test start posture data and, if a deviation equal to or greater than a predetermined standard posture threshold exists between at least one of the sensor signals (the posture of the corresponding member of the front working device) and its corresponding test start posture data, displays a reoperation guide image on the LCD 507 to urge reoperations so that all the operating members take the corresponding postures represented by the test start posture data.

In this embodiment, the posture comparison and determination section 55 compares all the sensor signals with their corresponding test staring posture data, respectively, and, if a deviation smaller than the predetermined standard posture threshold exists between each of the sensor signals and its corresponding test start posture data, determines that all the operating members have taken their corresponding postures represented by the test start posture data, and outputs a start storing signal to the collected data storage section 54 to start storing the acquired strokes and postures (movement quantities).

If a deviation equal to or greater than a predetermined stop storing threshold (second stop storing threshold) exists between at least one of the posture sensor signals and the standard posture data of the corresponding operating member in the standard operation procedures out of the standard operation pattern data, the posture comparison and determination section 55 outputs a stop storing signal to the collected data storage section 54 to stop storing the acquired strokes and postures.

The video reconstruction section 56 reads the postures of the individual operating members as stored in the collected data storage section 54, and reconstructs and displays a replay image representing an operational status of the hydraulic excavator 10 upon acquisition of the postures.

Based on the sensor signals acquired and stored in the sensor signal storage area 542 of the collected data storage section 54, the operational condition measurement data output section 57 outputs operational condition measurement data to the LCD 507.

The stroke comparison and determination section 58 compares the strokes stored in the collected data storage section 54 with their corresponding standard strokes in the standard operation procedures out of the standard operation pattern data stored in the standard operation pattern storage section 53, respectively, and, if a deviation equal to or greater than a predetermined standard stroke threshold is determined to exist between at least one of the strokes and its corresponding standard stroke, reads the operation guide image from the standard operation pattern storage section 53 and displays it on the LCD 507.

In this embodiment, the stroke comparison and determination section 58 outputs a stop storing signal to the collected data storage section 54 to stop storing the acquired strokes and postures if a deviation equal to or greater than a predetermined stop storing threshold (first stop storing threshold) exists between at least one of the strokes and its corresponding standard stroke.

Figure 4:
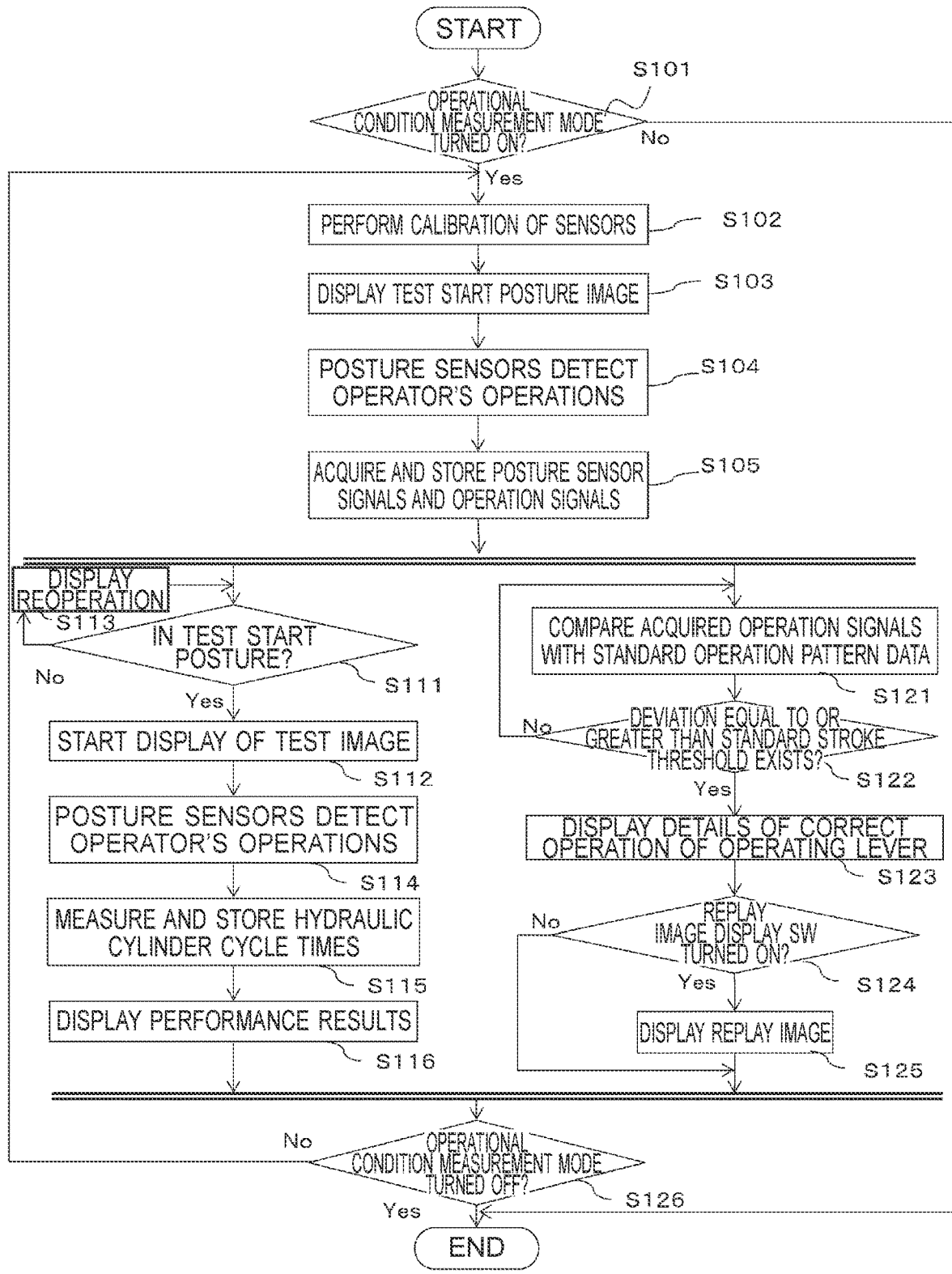
FIG. 4 is a flow chart illustrating an operational flow of the operation guide device.

With reference to FIG. 4, a description will hereinafter be made step by step about a flow of processing according to the functions of these individual configuration elements. FIG. 4 is a flow chart illustrating an operational flow of the operation guide device.

If an engine of the hydraulic excavator 10 is started, a main power supply for the main controller 20 and operation guide device 50 is turned on. If the operator has performed selection operation of the operational condition measurement mode through the mode selector SW 5081 (S101/Yes), collection processing of sensor signals and operation signals to be used in measurement of operational conditions is started.

In the sensor signal collection processing, the hydraulic excavator 10 is posed in a test start posture, and is then subjected to a predetermined test movement. In the course of the test movement, sensor signals are collected to perform internal diagnosis of the hydraulic excavator 10. If the predetermined test movement cannot be exactly performed in the sensor signal collection processing, a problem may arise that the measurement of operational conditions based on the collected sensor signals may be lowered in accuracy. An operation guide is, therefore, performed so that the test movement can be performed exactly.

If the operational condition measurement mode has not been selected (S101/No), the processing is ended. The expression "processing is ended" as used herein includes a transition to normal movements, specifically to a normal movement mode that is not accompanied by the collection of sensor signals. In the normal movement mode, the front working device and the upperstructure move according to input operations by the operator through the operating levers.

If the operational condition measurement mode is started, calibration signals are outputted from the data acquisition section 51 to the sensors, and calibration is performed at each sensor (S102).

The test image display section 52 reads, from the standard operation pattern storage section 53, the test start posture data included in the standard operation pattern data, and displays a test start posture image on the LCD 507 (S103). If the body is moved under automatic control, this step may be programmed so that an "automatic control verification image" is stored beforehand in the standard operation pattern in the standard operation pattern storage section 53, the test image display section 52, before starting a test, reads the "automatic control verification image" and displays it on the LCD 507 and, if no problem arises from moving the body under the automatic control, urges to operate the input device, and after confirming that the operator has performed predetermined operations, automatic operation is started. Further, it is desired to perform control so that, if there is another input during the automatic control (for example, if one of the input device is operated again), specifically if the automatic control of the body is cancelled and the body is stopped or if the operator has operated a lever or pedal, the automatic control is cancelled and the body is subjected to normal movements according to operator's lever and pedal operations. A description will hereinafter be made taking operator's manual operations as an example instead of such automatic control.

Based on the test start posture image, the operator operates the right lever 17 and left lever 18 so that the hydraulic excavator 10 takes the test start posture, the posture sensors (boom angle sensor 31, bucket angle sensor 32, arm angle sensor 33, and upper structure angle sensor 34) individually detect the posture of the hydraulic excavator 10 as the results of the operations by the operator, and sensor signals that represent the detection results are outputted (S104).

The data acquisition section 51 acquires sensor signals from the boom angle sensor 31, bucket angle sensor 32, arm angle sensor 33, upperstructure angle sensor 34, hydraulic oil temperature sensor 41 and engine rpm sensor 42, respectively, and operation signals from the operating levers, and store them in the operation signal storage area 541 and sensor signal storage area 542 in the collected data storage section 54 (S105). Further, during from the determination of the start of a boom raise until the determination of the transition of the boom to a most raised state by the posture comparison and determination section 55, for example, the data acquisition section 51 acquires sensor signals from the boom angle sensor 31, the bucket angle sensor 32, the arm angle sensor 33, the upperstructure angle sensor 34, the hydraulic oil temperature sensor 41, the engine rpm sensor 42, a body inclination sensor 43 and a cylinder pressure sensor 44, respectively, and operation signals from the operating levers, specifically control signals, and store them in the operation signal storage area 541 and sensor signal storage area 542 in the collected data storage section 54. These sensor signals and operation signals, specifically control signals correspond to the operational condition measurement data.

Based on the boom angle signal, bucket angle signal, arm angle signal and revolving angle signal acquired in step S105, the posture comparison and determination section 55 determines whether the posture of the hydraulic excavator 10 matches the test start posture. If matches the test start posture (S111/Yes), the test image display section 52 reads test images from the standard operation pattern storage section 53, and starts displaying the test images successively (S112).

If does not match, the posture comparison and determination section 55 outputs an instruction for reoperation of the test start posture to the LCD 507 (S113). Here, if the instruction for the reoperation is performed more than a preset number of times, a stop storing signal may be outputted to the data acquisition section 51 to end the processing (as indicated by a dashed line in FIG. 3).

Figure 5:
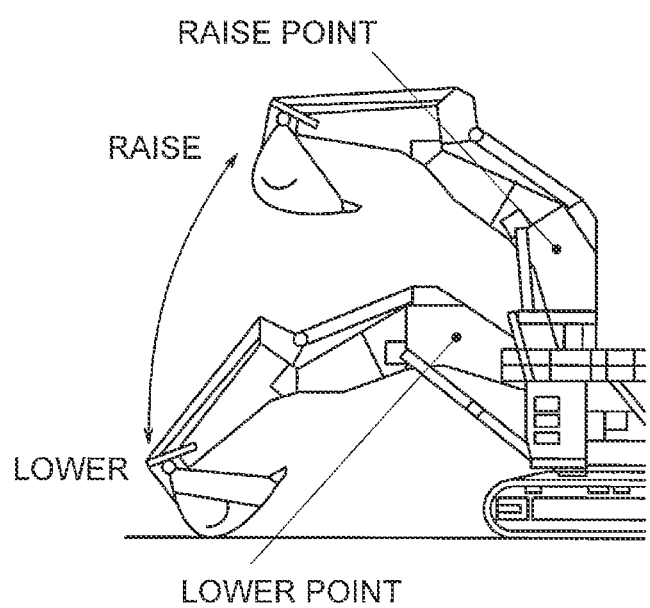
FIG. 5 is a view depicting an example of a test image.

FIG. 5 is a view depicting an example of such test images. If a test movement is a raise and lower movement of the boom 14, a video, in which the boom 14 is caused to transition from a state with the boom 14 being lowered most (from a state with the bucket 16 being grounded at a bottom surface thereof) to a state with the boom 14 being raised most, may be displayed as a test image. The operator operates the right lever 17 and left lever 18 so that the hydraulic excavator 10 performs the same movement as the test image, and the posture sensors (the boom angle sensor 31, bucket angle sensor 32, arm angle sensor 33, and upperstructure angle sensor 34) individually detect the posture of the hydraulic excavator 10 as the results of the operations by the operator, and output sensor signals that represent the results of the detection (S114)

The posture comparison and determination section 55 measures and stores hydraulic cylinder cycle times based on the sensor signals, respectively (S115). The term "hydraulic cylinder cycle time" as used here in means, for example, a time required until the bucket 16 transitions from a boom lower position, where the bottom surface of the bucket 16 is in contact with the ground, to the most raised state, and is equivalent to the extension time of a boom cylinder. Upon measurement of the hydraulic cylinder cycle time of the boom 14, for example, the posture comparison and determination section 55 may measure the hydraulic cylinder cycle time of the boom 14 by counting the number of clocks of the CPU 501 from the beginning of an increase in boom angle signal until the occurrence of no further change in boom angle. The posture comparison and determination section 55 stores the results of these measurements in the sensor signal storage area 542.

Further, during from the determination of the start of the boom raise until the determination of the transition of the boom to the most raised state by the posture comparison and determination section 55, the data acquisition section 51 acquires sensor signals from the sensors and operation signals from the right lever 17 and left lever 18, specifically control signals, and performs processing to store them in the operation signal storage area 541 and sensor signal storage area 542 in the collected data storage section 54.

Figure 6:
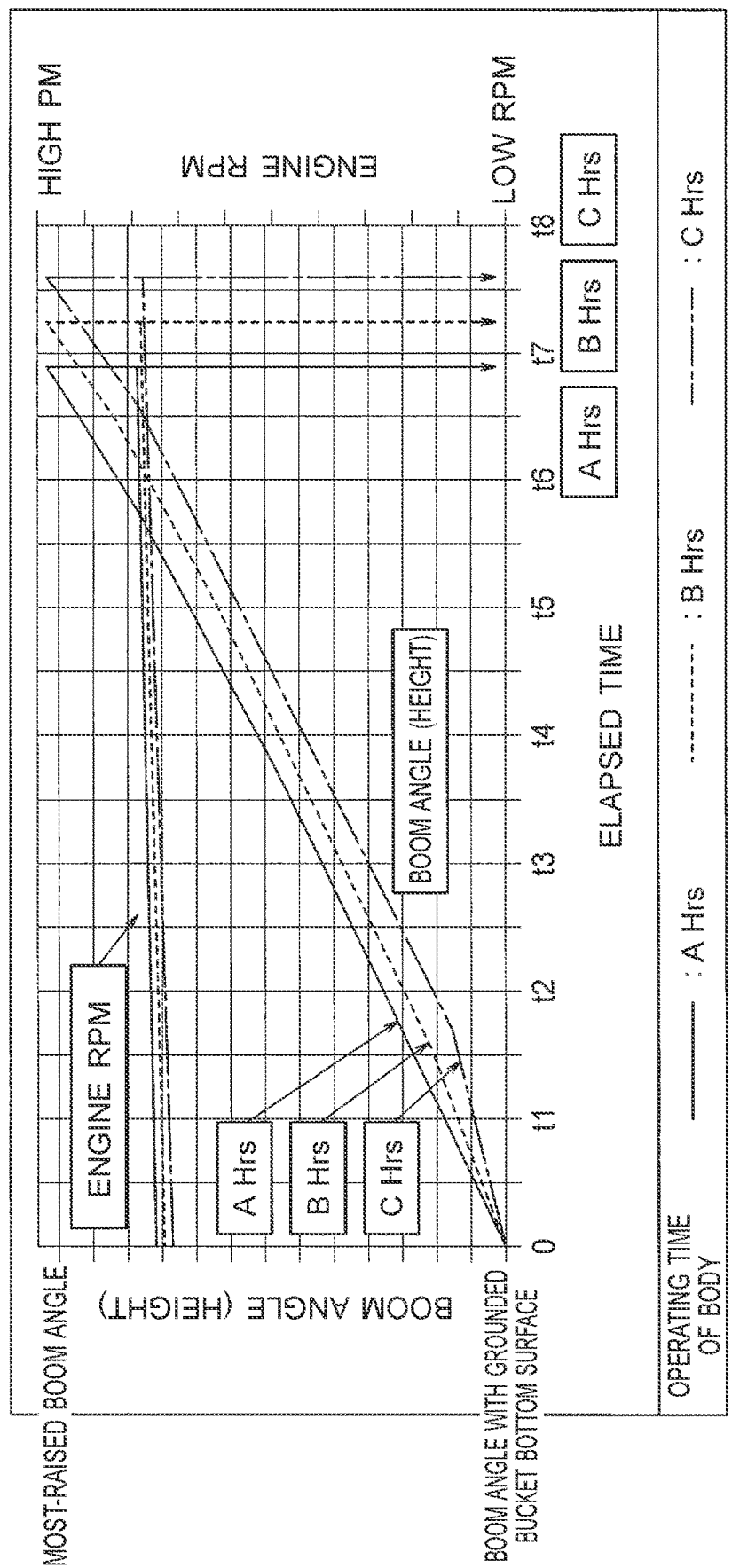
FIG. 6 is a graphic representation showing an example of operational condition measurement data.

Based on the collected sensor signals, the operational condition measurement data output section 57 outputs operational condition measurement data, in other words, displays performance results (S116). It is to be noted that, if the operator does not want to output the operational condition measurement data, this step can be skipped. FIG. 6 shows an example of operational condition measurement data. In FIG. 6, it is indicated that the time required for the predetermined movement becomes longer due to increased friction or the like by an increase in the operating time of the hydraulic excavator 10.

In this embodiment, an hour meter 45 is further included to count the operating time of the hydraulic excavator 10. The posture comparison and determination section 55 measures the cycle time if one of the movements in the standard operation pattern is repeated a plurality of times as the operating time measured by the hour meter 45 proceeds. If at least one piece of the data of the cycle time is equal to or greater than a predetermined standard time threshold, a stop storing signal is outputted to the collected data storage section 54 to stop storing the acquired operation signals and sensor signals. The time (cycle time) required for the predetermined movement becomes longer due to increased friction or the like by an increase in the operating time (see FIG. 6). If the cycle time is equal to or longer than the standard time threshold that specifies a cycle time at the time of a normal movement, the at least one movement is considered to be a movement not suited for reference as an operation guide, and therefore the storage is stopped. As a consequence, it is possible to collect data only at the time of normal movements, and hence to improve the quality of the operation guide.

On the other hand, the stroke comparison and determination section 58 acquires an operation signal of the right lever 17 or left lever 18 the operation of which has been performed during the display of the test image, and compares the acquired operation signal with the corresponding piece of data out of the standard operation pattern data (S121).

Figure 7:
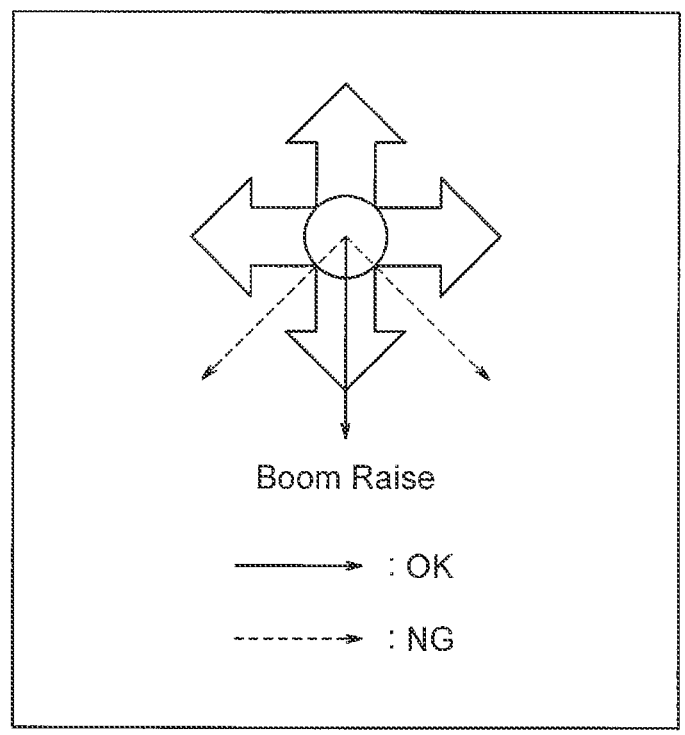
FIG. 7 is a diagram illustrating an example of an operation guide display.

If a deviation equal to or greater than the predetermined standard stroke threshold exists between the acquired operation signal and the corresponding piece of data out of the standard operation pattern data (S122/Yes), details of a correct operation of an operating lever (operation guide image) is displayed on the LCD 507 (S123). FIG. 7 illustrates an example of the operation guide image. In the example of FIG. 7, the stroke comparison and determination section 58 has displayed by changing the manner of display between a correct operating direction and a wrong operating direction of the operating lever. The wrong operation direction may be a direction in which the operator actually tilted down the operating lever. As a consequence, the operator can perform an operation in conformity with the test movement by visually checking the operation guide display.

If there is no deviation equal to or greater than the standard operation threshold between the acquired operation signal and the corresponding piece of data out of the standard operation pattern data (S122/No), the processing returns to S121 and the test is continued.

If a deviation smaller than the threshold exists between the acquired operation signal and the corresponding piece of data out of the standard operation pattern data, the storage of operation signals and sensor signals may be once stopped (as indicated by a dashed line in FIG. 3). Here, it may be programed to set the first stop storing threshold for the determination of a stop of the storage beforehand and, if the deviation of an input operation from the corresponding piece of data out of the standard operation pattern data becomes equal to or greater than the first stop storing threshold, to output a stop storing signal. As a consequence, if the operator cannot exactly perform the test movement in the operational condition measurement mode, a correct test operation can be presented to the operator and, if an operation departing from the standard movement is performed, sensor signals can be prevented from being collected as data for the measurement of operational conditions.

If the operator has depressed the replay image display SW 5082 after performing the test movement (S124/Yes), the video reconstruction section 56 reconstructs a replay image, which is formed of an animation video image that replicates the details of operations by the operator, based on the collected data of the operation levers, and displays the replay image on the LCD 507 (S125). Referring to the replay image, the operator can check how the front working device and the upperstructure pivoted and revolved by his or her own inputs through the operating levers. For example, the operator can recognize his or her inputting habit through the operating levers, of which the operator is not aware by himself or herself, for example, such as that the right lever deviated a little leftward or rightward and the bucket also moved at the same time although the operator intended to tilt the right lever down backward. If the operator does not depress the replay image display SW 5082 (S124/No), the processing proceeds to step S126.

If the operational condition measurement mode has not been turned off (S126/No), the processing returns to S102. If has been turned off (S126/Yes), the processing is ended.

According to this embodiment, it can be expected to suppress variations that depending on the operation skill level of each operator, occur in sensor signals to be used for the measurement of operational conditions of a hydraulic excavator.

The above-described embodiment is not intended to limit the present invention, and a variety of modifications is encompassed in the present invention. The foregoing description is made taking a hydraulic excavator as an example of a mining work machine, but the mining work machine is not limited to such a hydraulic excavator, and may be a wheel loader or dump truck. In such a case, the sensor signals and operation signals may be changed, as needed, depending on the kind of the machine.

In the foregoing, the raise and lower movement of the boom 14 is mentioned as an illustrative test movement, but pivoting of the arm 15, pivoting of the bucket 16 or revolving of the upperstructure 12 may be used as a test movement. Further, a raise and lower movement of the boom 14 and rotation of the upperstructure 12 may be performed at the same time, or a combination of desired two or more of a raise and lower movement of the boom 14, pivoting of the arm 15, pivoting of the bucket 16, and rotation of the upperstructure 12 may be used as a test movement.

LEGENDS

10: Hydraulic excavator (mining work machine)
50: Operational guide device

The invention claimed is:
1. An operation guide device for a hydraulic excavator including an undercarriage, an upperstructure disposed so as to revolve on the undercarriage and an articulated front working device raisably and lowerably disposed on the upperstructure, wherein:
the hydraulic excavator includes:
a plurality of potentiometers that is provided on respective operating devices comprised of electric levers and configured to operate respective operating members, which construct the front working device, and the upperstructure so that operation signals are generated corresponding to input operations by an operator, a plurality of proportional solenoid valves that drives a plurality of actuators which actuate the respective operating members and upperstructure in correspondence to the operation signals from the potentiometers, and a main controller programmed to control the proportional solenoid valves responsive to the operation signals;

the operation guide device comprises a guide controller connected to each of the main controller and a display;

the guide controller comprises a standard operation pattern storage section and a collected data storage section, which are comprised of a storage device; and the guide controller is programmed:

to store, beforehand, standard operation procedures for a time of measurement of operational conditions, standard operation pattern data representing standard strokes in individual procedures included in the standard operation procedures, and an operation guide image representing details of standard operations along the standard operation procedures, to acquire operation signals representing details of operations of at least one of the operating devices by the operator and to store the operation signals along a time series in the collected data storage section, to compare a stroke of the at least one operating lever as derived from each operation signal stored in the collected data storage section with the corresponding standard stroke indicated in the standard operation pattern data, and if a deviation equal to or greater than a predetermined standard stroke threshold is determined to exist between the operating stroke and the standard stroke, to read the operation guide image from the standard operation pattern storage section and to display the operation guide image on the display.

2. The operation guide device according to claim 1, wherein:

the guide controller is programmed to stop storing the acquired operation signals in the collected data storage section if the deviation between the stroke and the standard stroke is determined to be equal to or greater than a predetermined first stop storing threshold.

3. The operation guide device according to claim 1, wherein:

the hydraulic excavator further includes a plurality of posture sensors that detect movement quantities of the respective operating members and upperstructure actuated by the proportional solenoid valves, respectively;

the posture sensors are each connected to the main controller; and the guide controller is programmed:

to store, beforehand, operational condition measurement starting position data, which define postures of the operating members of the hydraulic excavator at a starting time of measurement of operational conditions, and a reoperation guide image, which urges reoperations so that the operating members take the postures represented by the operational condition measurement starting posture data, in the standard operation pattern storage section, to acquire posture sensor signals outputted by the posture sensors, to store the posture sensor signals in association with the operation signals along a time series in the collected data storage section, to compare the posture sensor signals with the operational condition measurement starting posture data, respectively, and, if a deviation equal to or greater than a predetermined standard posture threshold is determined to exist between at least one of the posture sensor signals and the corresponding one of the operational condition measurement starting posture data, to read the reoperation guide image from the standard operation pattern storage section, and to display the same on the display.

4. The operation guide device according to claim 1, wherein:

the hydraulic excavator further includes a plurality of posture sensors that detect movement quantities of the respective operating members and upperstructure actuated by the proportional solenoid valves, respectively;

the posture sensors are each connected to the main controller; and the guide controller is programmed:

to store, beforehand, operational condition measurement starting position data, which define postures of the operating members of the hydraulic excavator at a starting time of measurement of operational conditions, in the standard operation pattern storage section, to acquire posture sensor signals outputted by the posture sensors, to store the posture sensor signals in association with the operation signals along a time series in the collected data storage section, and to compare the posture sensor signals with the operational condition measurement starting posture data, respectively, and, if a deviation equal to or smaller than a predetermined standard posture threshold is determined to exist between each of the posture sensor signals and the corresponding one of the operational condition measurement starting posture data, to start storing the operation signals and posture sensor signals in the collected data storage section.

5. The operation guide device according to claim 3, wherein:

the guide controller is programmed to stop storing the operation signals and posture sensor signals in the collected data storage section if a deviation equal to or greater than a predetermined second stop storing threshold is determined to exist between at least one of the posture sensor signals and the standard movement quantity of the corresponding operating member in the standard operation procedures out of the standard operation pattern data.

6. The operation guide device according to claim 1, wherein:

the hydraulic excavator further includes a plurality of posture sensors that detect movement quantities of the respective operating members and upperstructure actuated by the proportional solenoid valves, respectively;

the posture sensors are each connected to the main controller; and the guide controller is programmed:

to acquire posture sensor signals outputted by the posture sensors, and to store the posture sensor signals in association with the operation signals along a time series in the collected data storage section, and to read the posture sensor signals of the operating members as stored in the collected data storage section, to reconstruct a replay image representing an operational status of the hydraulic excavator at a time of the acquisition of the posture sensor signals, and to display the replay image on the display.

7. The operation guide device according to claim 3, wherein:
the hydraulic excavator further includes an hour meter that counts an operating time of the hydraulic excavator;
the main controller is connected to the hour meter; and
the guide controller is programmed to measure cycle times if a movement out of the standard operation pattern data is repeated a plurality of times as the operating time measured by the hour meter proceeds, and, if at least one of the cycle times is equal to or greater than a predetermined standard time threshold, to stop storing the operation signals and posture sensor signals in the collected data storage section.

* * * * *